United States Patent
Kose

(10) Patent No.: US 8,307,130 B2
(45) Date of Patent: Nov. 6, 2012

(54) CONTROL SYSTEM, OPERATION DEVICE AND CONTROL METHOD

(75) Inventor: Hiroaki Kose, Tokyo (JP)

(73) Assignee: Sony Corporation (JP)

( * ) Notice: Subject to any disclaimer, the term of this patent is extended or adjusted under 35 U.S.C. 154(b) by 105 days.

(21) Appl. No.: 12/799,004

(22) Filed: Apr. 15, 2010

(65) Prior Publication Data

US 2010/0274932 A1 Oct. 28, 2010

(30) Foreign Application Priority Data

Apr. 27, 2009 (JP) ................................ P2009-108184

(51) Int. Cl.
*G06F 13/10* (2006.01)

(52) U.S. Cl. ................................ 710/8; 710/18; 710/19

(58) Field of Classification Search ........................ None
See application file for complete search history.

(56) References Cited

U.S. PATENT DOCUMENTS

| | | | |
|---|---|---|---|
| 6,418,536 B1 * | 7/2002 | Park | 713/323 |
| 2010/0090661 A1 * | 4/2010 | Chen et al. | 320/157 |
| 2010/0257392 A1 * | 10/2010 | Ranta | 713/323 |

FOREIGN PATENT DOCUMENTS

JP 2000-222120 A 8/2000

* cited by examiner

*Primary Examiner* — Ilwoo Park
(74) *Attorney, Agent, or Firm* — Lerner, David, Littenberg, Krumholz & Mentlik, LLP

(57) ABSTRACT

There is provided an information processing apparatus including an execution unit for executing an application, a threshold value setting unit for setting, according to the running application, a threshold value which determines a timing of changing an operational state of the external device, a first detection unit for detecting an input signal, and a first transmission and reception unit for exchanging information with an external device. Moreover, there is provided the external device including a second transmission and reception unit for exchanging information with the information processing apparatus, a second detection unit for detecting an input signal, a determination unit for determining whether or not to change the operational state of the external device from the threshold value based on the detection result, and a change processing unit for changing the operational state of the external device based on the determination result.

21 Claims, 9 Drawing Sheets

FIG.4
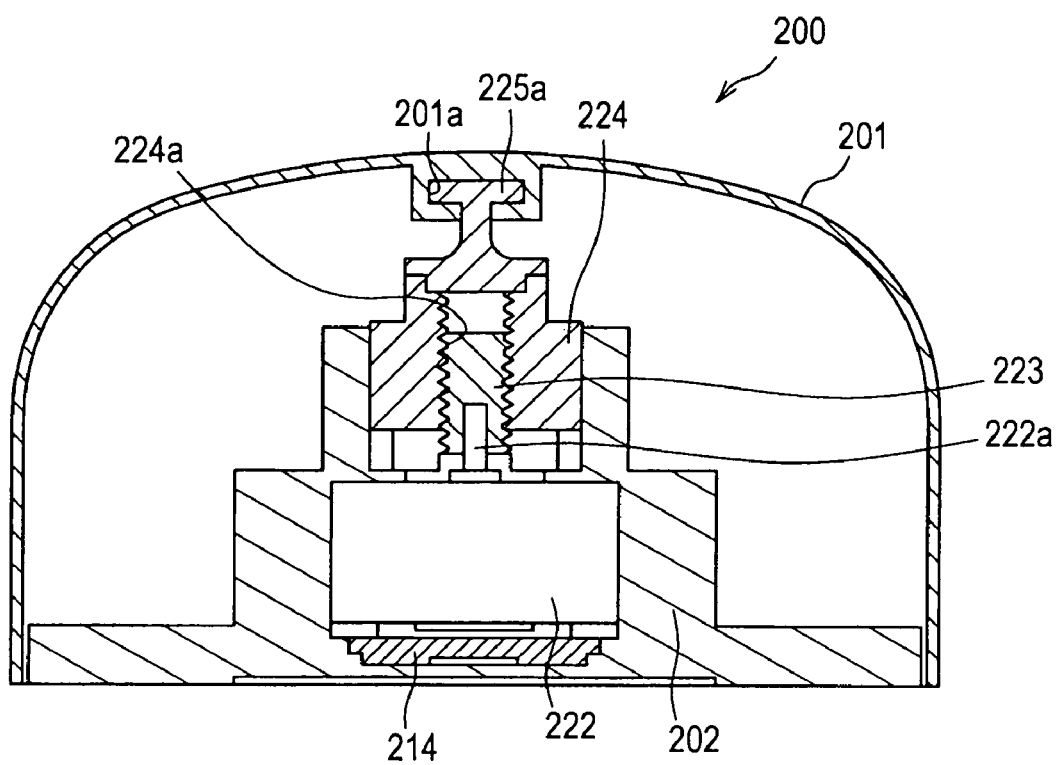
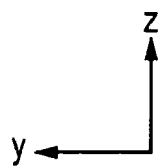

CONTROL SYSTEM, OPERATION DEVICE AND CONTROL METHOD

CROSS-REFERENCE TO RELATED APPLICATION

The present application claims priority from Japanese Patent Application No. JP 2009-108184 filed in the Japanese Patent Office on Apr. 27, 2009, the entire content of which is incorporated herein by reference.

BACKGROUND OF THE INVENTION

1. Field of the Invention

The present invention relates to a control system, an operation device and a control method.

2. Description of the Related Art

A variety of processing such as document creation, table calculation, and processing and editing of photo data or video data can be performed by using an information processing apparatus such as a personal computer. Moreover, by connecting the information processing apparatus to a network, a variety of information can be obtained and communication can be made using e-mail, an IP phone and the like. Such information processing apparatus have become generally used with the increasing penetration rate of the Internet.

With the diversification of processing executable by the information processing apparatus, usability of the information processing apparatus has been desired and a variety of peripheral devices used for operating the information processing apparatus have been provided. For example, the peripheral devices include a mouse for operating a cursor, which for example, selects an icon displayed on the display, and a keyboard for inputting characters. The functions and the configurations of such peripheral devices are also improving in order that a user can use the information processing apparatus more comfortably.

For example, the mouse is generally used as a peripheral device of the information processing apparatus, since a cursor can be operated more easily with the mouse than the keyboard. Since the user moves the position of the mouse itself in order to move the cursor position on the screen, if the mouse is wire-connected to the information processing apparatus via a cable, the operation by the mouse may be hindered by the cable. Therefore, there is provided a wireless mouse capable of wirelessly connecting to the information processing apparatus. Moreover, there is disclosed a self-propelled mouse which includes a self-propelled function and moves according to an instruction from the information processing apparatus (e.g., Japanese Unexamined Patent Application Publication No. 2000-222120. Such self-propelled mouse can be used as an output device for outputting information from the information processing apparatus such as warning or expressing information entertainingly such as moving like dancing to the music.

SUMMARY OF THE INVENTION

However, the self-propelled mouse in the Japanese Unexamined Patent Application Publication No. 2000-222120 is wire-connected to the information processing apparatus, so that the range of self-motion is limited to the length of the cable. Moreover, the self-propelled function for outputting information from the information processing apparatus does not work when the information processing apparatus is in a pause state or is switched off. In this manner, the self-propelled mouse in the past did not move at its own discretion, and moreover, it did not improve the operability and the usability of the information processing apparatus.

In light of the foregoing, it is desirable to provide a control system, an operation device and a control method which are novel and improved, and which are capable of improving the convenience of an information processing apparatus by changing an operational state of an external device according to a use state of the information processing apparatus.

According to an embodiment of the present invention, there is provided an control system including an information processing apparatus and an external device communicably connected with the information processing apparatus. The information processing apparatus includes an execution unit for executing an application, a threshold value setting unit for setting, according to the running application, a threshold value which determines a timing of changing an operational state of the external device, a first detection unit for detecting an input signal to the information processing apparatus, and a first transmission and reception unit for exchanging information with the external device. The external device includes a second transmission and reception unit for exchanging information with the information processing apparatus, a second detection unit for detecting an input signal to the external device, a determination unit for determining whether or not to change the operational state of the external device from the threshold value set by the threshold value setting unit of the information processing apparatus based on the detection result by the first detection unit or the second detection unit, and a change processing unit for changing the operational state of the external device based on the determination result by the determination unit.

According to the present invention, the threshold value is set according to the application executed in the information processing apparatus and a timing of changing the operational state of the external device is determined. This enables the external device to function in a manner consistent with a user's purpose for using the information processing apparatus.

The threshold values setting unit may set a threshold value set for each of the information processing apparatus and the external device based on a use frequency of the external device which changes according to the application in execution. For example, the threshold values setting unit may set, for the external device which is frequently used, a lower threshold value than a threshold value for the information processing apparatus.

Moreover, when the first detection unit does not detect the input signal to the information processing apparatus, the determination unit may start to count nonuse time of the information processing apparatus. Then, when the first detection unit and the second detection unit do not detect the input signals to the information processing apparatus and the external device, and the counted nonuse time exceeds the threshold value, the determination unit determines to change the operational state of the external device.

Furthermore, when the second detection unit detects the input signal to the external device after the determination unit starts to count the nonuse time and before the counted nonuse time exceeds the threshold value, the determination unit may reset the counted nonuse time. When the first detection unit detects an input signal for terminating the running application, the determination unit may terminate the counting of the nonuse time.

According to another embodiment of the present invention, there is provided an operation device including an operation unit for operating an information processing apparatus which is communicably connected, a transmission and reception unit for exchanging information with the information processing apparatus, a determination unit for determining whether to change an operational state of the operation device from a threshold value which determines a timing of changing the operational state set according to the application being executed by the information processing apparatus, based on presence or absence information about an input signal input from the operation unit, and an input signal to the information processing apparatus received via the transmission and reception unit, and a change processing unit for changing the operational state based on a determination result by the determination unit.

Here, the operation device may further include a motion unit for moving the operation device to a predetermined position, a drive unit for driving the motion unit, and a position recognition unit for recognizing a position of the operation device. The change processing unit enables an operation by the operation unit until the nonuse time exceeds the threshold value, and when the nonuse time exceeds the threshold value, the change processing unit causes the drive unit to drive the motion unit to move the operation device to the predetermined position.

According to another embodiment of the present invention, there is provided a control method comprising the steps of executing an application by an information processing apparatus, determining a threshold value which determines a timing of changing an operational state of an external device communicably connected with the information processing apparatus according to the executed application, detecting an input signal to the information processing apparatus, detecting an input signal to the external device, determining whether or not to change the operational state of the external device from the threshold value based on the detection result of the input signal to the information processing apparatus or the input signal to the external device, and changing the operational state of the external device based on the determination result.

According to the embodiments of the present invention described above, there can be provided the control system, the operation device and the control method, capable of improving the convenience of the information processing apparatus by changing the operational state of the external device according to the use state of the information processing apparatus.

BRIEF DESCRIPTION OF THE DRAWINGS

FIG. 4 is a vertical cross-sectional view showing the configuration of the mouse according to the embodiment;

DETAILED DESCRIPTION OF THE EMBODIMENT

Figure 1:
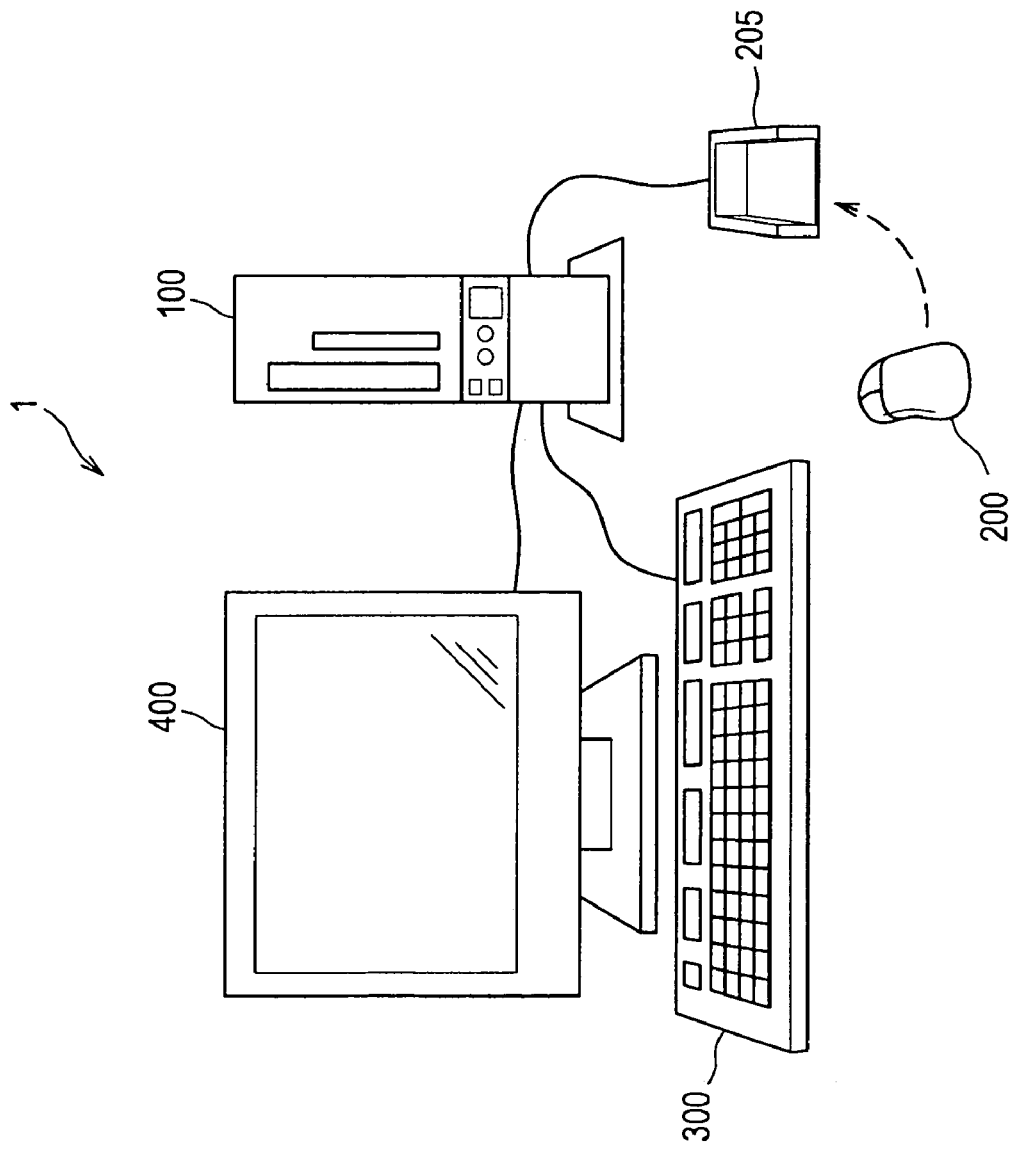
FIG. 1 is an explanatory diagram showing a configuration of a control system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. First embodiment (Example of a personal computer and a mouse)

2. Second embodiment (Example of an information processing apparatus and an external device)

First Embodiment (1) System Configuration Example

First, a schematic configuration of a control system according to a first embodiment of the present invention will be described based on FIG. 1. In addition, FIG. 1 is an explanatory diagram showing a configuration of a control system 1 according to the present embodiment.

The control system 1 according to the present embodiment includes an information processing apparatus 100 which is, for example, a personal computer, and a mouse 200, a keyboard 300 and a display 400 which are external devices communicably connected to the information processing apparatus 100, as shown in FIG. 1. The information processing apparatus 100 includes a processing unit capable of executing an application and is connected with an input device such as the mouse 200 and the keyboard 300 in order to operate the information processing apparatus 100. Moreover, the information processing apparatus 100 is connected to an output device such as the display 400 and a speaker (not shown in figures) in order to output the execution result of the application.

In the present embodiment, there will be described a control system for changing an operational state of the mouse 200 according to a use state of the information processing apparatus 100. The mouse 200 according to the present embodiment includes two modes: a normal mode in which the mouse 200 functions as an operation means of the information processing apparatus 100, and a motion mode in which the mouse 200 is self-propelled and moves to a battery charger 205. The mouse 200 operates by switching these modes according to the use state of the information processing apparatus 100 by a user, thereby improving the operability and the convenience of the information processing apparatus 100. In the following, the configuration of such control system 1 will be described in detail.

(2) Hardware Configuration

Figure 2:
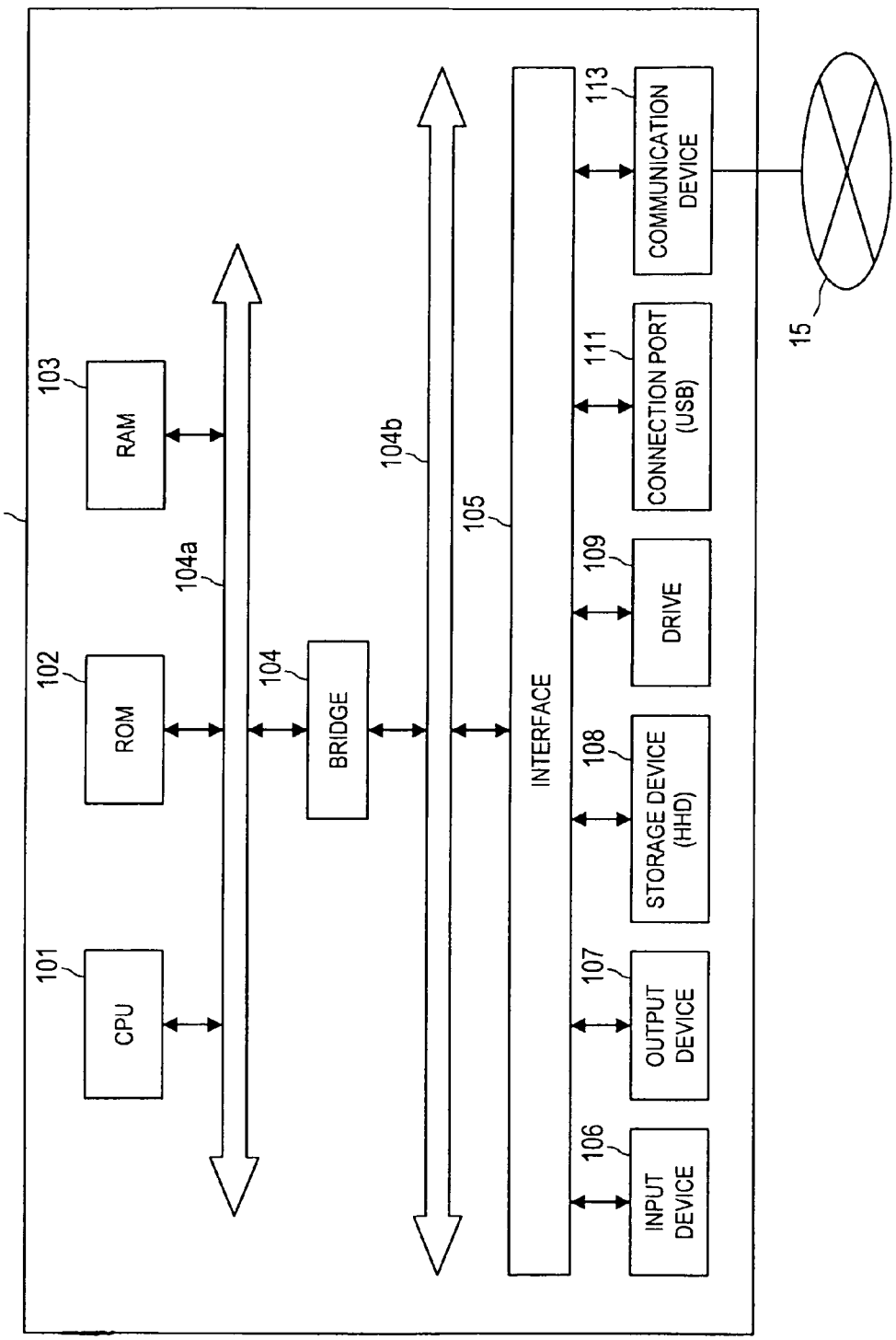
FIG. 2 is a block diagram showing a hardware configuration of an information processing apparatus according to the embodiment.
Figure 3:
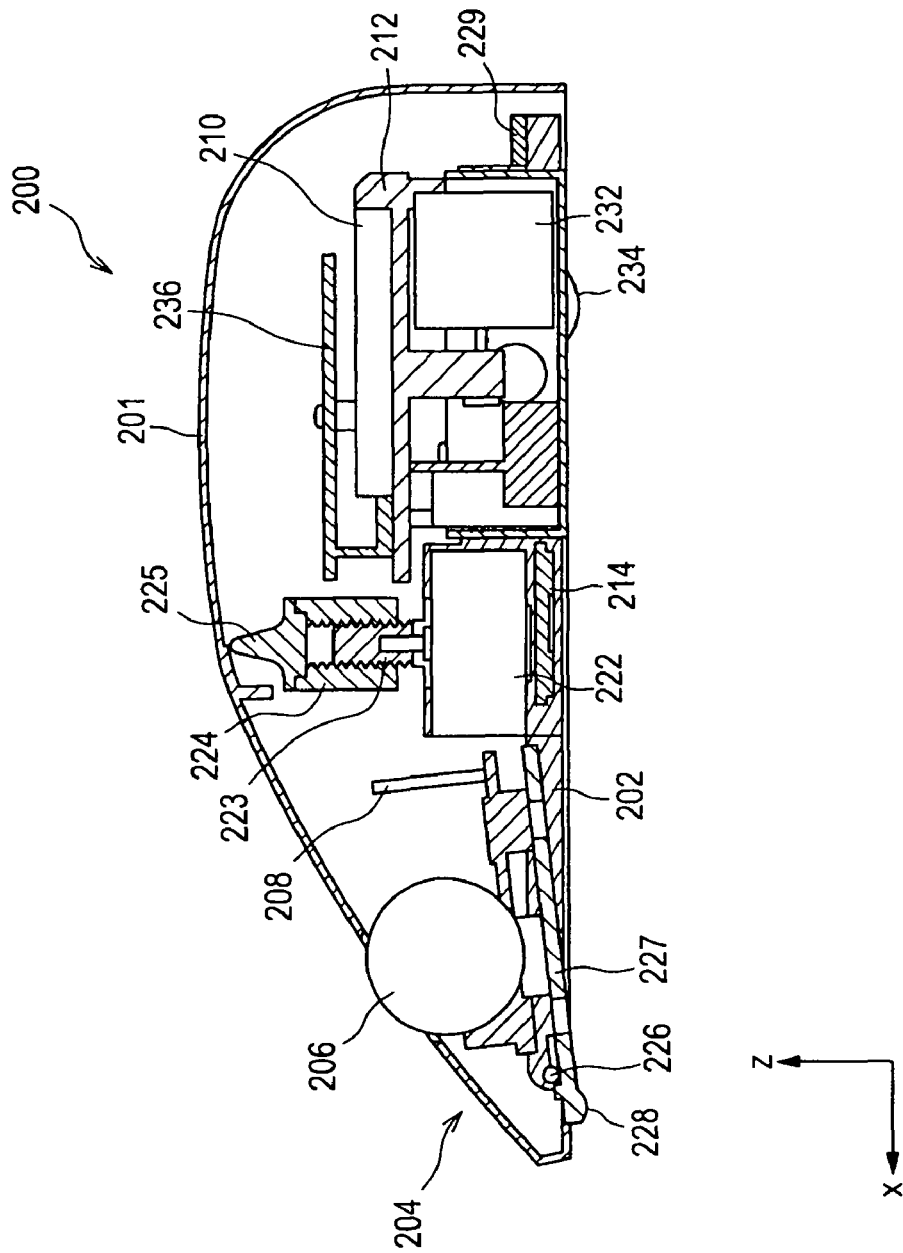
FIG. 3 is a longitudinal cross-sectional view showing a configuration of a mouse according to the embodiment.
Figure 5:
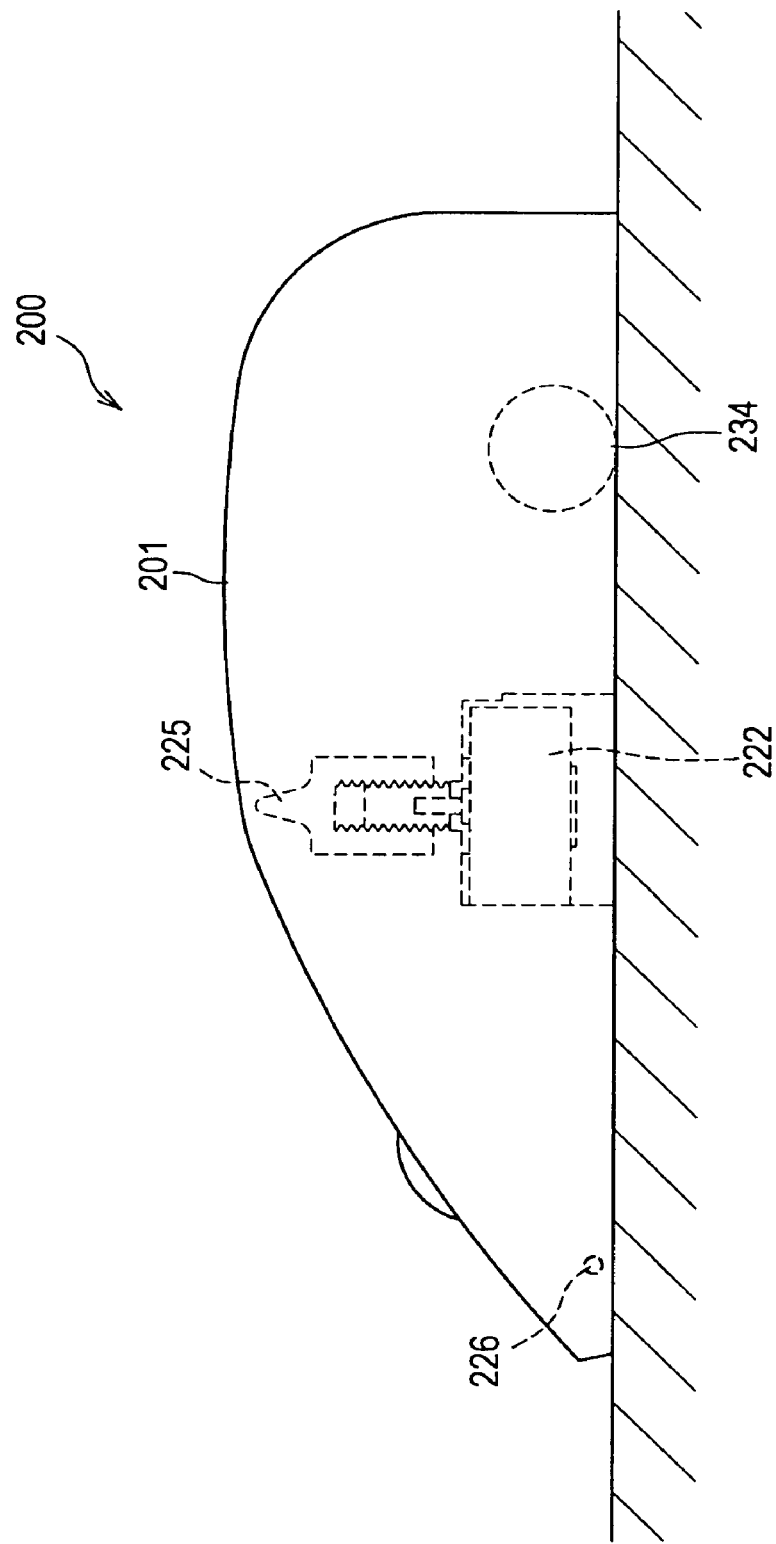
FIG. 5 is an explanatory diagram showing the mouse in normal mode according to the embodiment.
Figure 6:
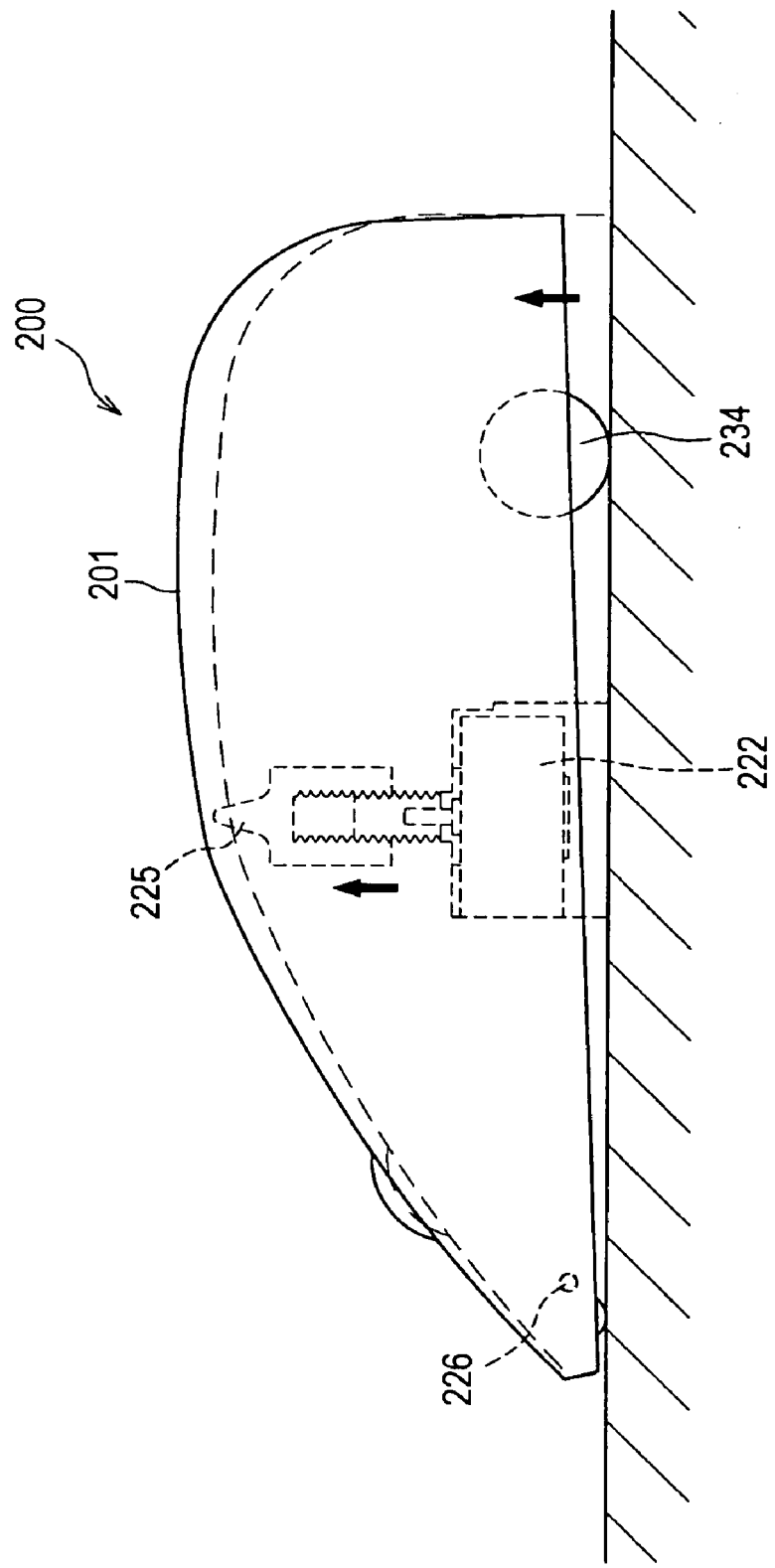
FIG. 6 is an explanatory diagram showing the mouse in motion mode according to the embodiment.

First, hardware configurations of the information processing apparatus 100 and the mouse 200 constituting the control system 1 according to the present embodiment will be described based on FIG. 2 to FIG. 6. In addition, FIG. 2 is a block diagram showing a hardware configuration of the information processing apparatus 100 according to the present embodiment. FIG. 3 is a longitudinal cross-sectional view showing a configuration of the mouse 200 according to the present embodiment. FIG. 4 is a vertical cross-sectional view showing the configuration of the mouse 200 according to the present embodiment. FIG. 5 is an explanatory diagram showing the mouse 200 in normal mode according to the present embodiment. FIG. 6 is an explanatory diagram showing the mouse 200 in motion mode according to the present embodiment.

[Hardware Configuration of the Information Processing Apparatus]

First, the hardware configuration of the information processing apparatus 100 according to the present embodiment will be described based on FIG. 2. The information processing apparatus 100 of the present embodiment includes a CPU (Central Processing Unit) 101, a ROM (Read Only Memory) 102, a RAM (Random Access Memory) 103, and a host bus 104a. Moreover, the information processing apparatus 100 includes a bridge 104, an external bus 104b, an interface 105, an input device 106, an output device 107, a storage device (HDD) 108, a drive 109, a connection port 111, and a communication device 113.

The CPU 101 functions as an arithmetic processing device and a control device and controls the entire operation within the information processing apparatus 100 according to a variety of programs. Moreover, the CPU 101 may be a microprocessor. The ROM 102 stores therein programs, calculation parameters and the like used by the CPU 101. The RAM 103 temporarily stores therein programs used in the execution of the CPU 101 and parameters that change appropriately in the execution, and the like. These are interconnected via the host bus 104a including a CPU bus and the like.

The host bus 104a is connected to the external bus 104b such as a PCI (Peripheral Component Interconnect/Interface) bus via the bridge 104. Incidentally, the host bus 104a, the bridge 104, and the external bus 104b are not necessarily configured separately and the functions thereof may be mounted on one bus.

The input device 106 includes an input means for a user to input information, such as a mouse, a keyboard, a touch panel, a button, a microphone, a switch, and a lever, and an input control circuit for generating an input signal based on input by the user and for outputting the input signal to the CPU 101. The user of the information processing apparatus 100 can input various types of data into, and give an instruction for performing processing operation to, the information processing apparatus 100 by operating the input device 106. In the present embodiment, the mouse 200 and the keyboard 300 are provided as the input device 106 as shown in FIG. 1.

The output device 107 includes, for example, a display device such as a CRT (Cathode Ray Tube) display device, a liquid crystal display (LCD) device, an OLED (Organic Light Emitting Display) device and a lamp. Furthermore, the output device 107 includes an audio output device such as a speaker and a headphone. In the present embodiment, the display 400 is provided as the output device 107 as shown in FIG. 1.

The storage device 108 is a device for data storage configured as an example of a storage unit of the information processing apparatus 100. The storage device 108 may include a storage medium, a recording device for recording data in the storage medium, a reading device for reading out the data from the storage medium, and a deletion device for deleting the data recorded in the storage medium. The storage device 108 includes a HDD (Hard Disk Drive), for example. This storage device 108 drives a hard disk and stores therein the programs or various types of data executed by the CPU 101.

The drive 109 is a reader/writer for storage medium and is built into or attached outside the information processing apparatus 100. The drive 109 reads out information recorded in a removable recording medium attached thereto such as a magnetic disk, an optical disk, a magneto-optical disk, or a semiconductor memory, and outputs the information to the RAM 103.

The connection port 111 is an interface connected to an external device and is a connection port capable of transmitting data to the external device via a USB (Universal Serial Bus) and the like, for example. Moreover, the communication device 113 is a communication interface including a communication device and the like for connecting to a communication network 15, for example. Moreover, the communication device 113 may be a communication device compatible with wireless LAN (Local Area Network), a communication device compatible with wireless USB or a wire communication device for wire or cable communication.

[Hardware Configuration of the Mouse]

Next, the hardware configuration of the mouse 200 according to the present embodiment will be described based on FIG. 3 to FIG. 6. The mouse 200 according to the present embodiment is configured to have a mouse unit, a battery unit, a transforming unit, a drive unit and the like in an internal space formed between an upper case 201 and a lower case 202, as shown in FIG. 3 and FIG. 4. These units are supported by the lower case 202.

The mouse unit includes members for operating the information processing apparatus 100 and includes a click button 204, a wheel 206, a control board 208, a position detection unit (not shown in figures) and the like.

The click buttons 204 are provided on the front surface side of the upper case 201 and include a right click button that is provided on the right side, and a left click button that is provided on the left side. When the right click button or the left click button is pressed by a user in the direction of z axis and thus clicked, a click detection unit (not shown in the figures) provided to the control board 208 detects the click, and outputs a click input signal indicating that a click has been performed. Depending on the manner of pressing the right click button and the left click button, there can be executed, for example, a function to display a menu related to a position indicated by a mouse pointer, or a function to operate a selection or decision application.

The wheel 206 is a ring-shaped member provided at the center of the front surface side of the upper member 201 such that it is sandwiched between the right click button and the left click button. The wheel 206 is provided such that it is rotatably supported by a support shaft (not shown in the figures) that extends in the direction of y axis in the internal space formed by the upper case 201 and the lower case 202, and such that a part of the wheel 206 is exposed to the outside of the upper case 201. When the user rotates the wheel 206 with a finger, the rotation of the wheel 206 is detected by a rotation detection unit (not shown in the figures), and there is output a rotation input signal indicating the rotation direction and the rotation speed of the wheel. Moreover, the wheel 206 can be configured such that it can be pressed in the direction of the z axis, and in this way, clicking operations can also be performed by the wheel 206. The detected input signals are transmitted to a control unit (not shown in the figures) that is mounted on a control board 208, and are transmitted from the control unit to a reception device for receiving these signals via an antenna (not shown in the figures).

The control board 208 is a board on which is mounted a control microcomputer for detecting an input signal from the click button 204 or the wheel 206 and for performing a switching control of the modes of the mouse 200. The control board 208 can be provided on a support plate on a base (reference numeral 227 in FIG. 3), for example.

The position detection unit detects the position, the moving distance, the moving direction and the moving speed of the mouse 200. The position detection unit can be provided to the lower cover 202, for example. The position detection unit includes a light emitting unit (not shown in the figures) for emitting light onto the placement surface of the mouse 200, and a light receiving unit (not shown in the figures) for receiving reflected light of the light emitted by the light emitting unit. The position detection unit transmits detected positional information to the control unit (not shown in the figures) mounted on the control board 208, and the control unit transmits information such as the positional information to the information processing apparatus 100 via the antenna (not shown in the figures).

The battery unit is a unit for supplying electric power necessary for the mouse 200 to move or to communicate with the information processing apparatus 100, and the battery unit includes a battery 210, a battery holder 212, a secondary coil and the like, for example.

The battery 210 supplies electric power necessary to make the mouse 200 work. In the present embodiment, a rechargeable secondary battery such as a lithium ion secondary battery may be used as the battery 210. However, not limited to this example, a non-rechargeable primary battery may be also used as the battery 210.

The battery holder 212 is a supporting member on which the battery 210 is mounted. The battery holder 212 is supported by the lower cover 202 at the bottom side of the mouse 200. Moreover, the battery holder 212 supports a drive board 236 described below.

The secondary coil 214 is a coil that generates a voltage for charging the battery 210. The secondary coil 214 is provided in the internal space of the mouse 200 at a position near the center of the lower cover, as shown in FIG. 3. When the secondary coil 214 is caused to face the primary coil (not shown in figures) provided to the battery charger 205, and then, an electric current is caused to flow through the primary coil, an electromotive force is induced in the secondary coil by electromagnetic induction. The battery 210 can be charged by using such voltage. The generated voltage is stabilized through a rectification circuit or the like and then is transmitted to the battery 170 that is electrically connected.

The transforming unit is a unit for changing the form of the mouse 200 according to the operational state (mode) of the mouse 200. The transforming unit includes a raising and lowering motor 222, a slider mechanism, a raising and lowering shaft 226, a base 227, a front wheel 228 and a switch sensor 229.

The raising and lowering motor 222 is a drive unit for moving up and down the upper cover 201 according to the operational state of the mouse 200 and is provided such that a rotation shaft 222a extends in the direction of the z axis. A lead screw 223 on whose outer peripheral surface is formed a screw thread is provided to the rotation shaft 222a of the raising and lowering motor 222 and rotates in accordance with the rotation of the raising and lowering motor 222. For example, when the raising and lowering motor 222 rotates in a positive direction, the slider mechanism screwed with the lead screw 223 moves in the positive direction of the z axis, and when the raising and lowering motor 222 rotates in the reverse direction, the slider mechanism engaged with the lead screw 223 moves in the negative direction of the z axis. The connection part 225 has one end connected to the other end of the nut 224 and the other end The slider mechanism is a transmission member for vertically moving the upper cover 201 in accordance with the rotation of the raising and lowering motor 222. As shown in FIG. 4, the slider mechanism includes a nut 224 and a connection part 225. The nut 224 is a cylindrically-shaped member including a through hole and on the inner peripheral surface of the nut 224 is formed a screw groove corresponding to the lead screw 223. The nut 224 has one end into which is inserted the lead screw 223 and the other end to which is connected the connection part 225. The connection part 225 is a connecting member for moving the upper cover 201 by moving together with the nut 224 that moves in the direction of the z axis by the rotation of the lead screw 223. The connection part 225 has one end connected to the other end of the nut 224 and has the other end on which is formed an engaging part 225a for connecting the connection part 225 to the upper cover 201. The engaging part 225a is engaged with an engaged part 201a formed in the inner surface of the upper cover 201. In this manner, the nut 224 and the upper cover 201 are connected to each other via the connection part 225. In addition, the slider mechanism is provided such that the connected position of the upper cover 201 and the slider mechanism is located at the backward of the position of the center of gravity (on the negative side of the z axis).

The raising and lowering shaft 226 is a central axis of rotation when the base 227 is rotated with respect to the lower cover 202. The raising and lowering shaft 226 is provided at the front part of the internal space of the mouse 200 so as to extend in the direction of the y axis, and the both ends of the raising and lowering shaft 226 are rotatably supported by the lower case 202. Moreover, at least a part of the center of the raising and lowering shaft 226 are rotatably supported by the base 227.

The base 227 is a base which supports the wheel 206 and the front wheel 228 and which is rotatably supported with respect to the lower case 202. The base 227 is provided at the front part of the mouse 200 (on the positive side of the x axis) and is connected with the upper cover 201. Accordingly, the base 227 rotates with the raising and lowering shaft 226 as the center of rotation along with the movement of the upper cover 201. By providing such base 227, the front wheel 228 can be put in and out according to the state of the mouse 200. In addition, such operation will be described in detail later.

The front wheel 228 is a wheel provided for the mouse 200 to move in the motion mode. The wheel 228 is provided at the front of the base 227 as shown in FIG. 3. The front wheel 228 rotates following the rotation of wheels 234 described below. The front wheel 228 is put in and out from the internal space of the mouse 200 according to the drive of the raising and lowering shaft 226.

The switch sensor 229 is a sensor used for switching the mouse 200 from the motion mode to the normal mode. The switch sensor 229 may be a Hall sensor, and at this time, a magnet corresponding to the Hall sensor may be provided to the battery charger 205. In addition, as the switch sensor 229 there may be used a magnetic sensor, an optical sensor, or a button for automatically detecting an input, for example. When having detected a predetermined input (e.g., magnetism), the switch sensor 229 outputs the detection result to the control board 208.

The drive unit is a unit which functions to move the mouse 200 to a predetermined position when the mouse is in the motion mode, and the drive unit includes a motion motor 232, the wheels 234, the drive board 236, a motion detection unit (not shown in figures) and the like, for example.

The motion motor 232 is a drive unit for rotating the wheels 234. The motion motor 232 is provided to each of the two wheels 234. The motion motor 232 is drive-controlled by a driver (not shown in figures) provided to the drive board 236.

The wheels 234 are members for moving the mouse 200 to the predetermined position and are provided at the back part of the internal space of the mouse 200. The mouse 200 according to the present embodiment is provided with the two wheels 234 arranged along the y axis. The wheels 234 are put in and out from the internal space of the mouse 200 according to the operational state of the mouse 200.

The drive board 236 is a board including the driver for driving the motion motor 232, a position processing unit (not shown in figures) for recognizing a position of the mouse 200, an analysis unit for analyzing the detection result by the motion detection unit. The drive board 236 is supported by the battery holder 212 so as to be positioned above the battery 210 (on the positive side of the z axis).

The motion detection unit is a sensor for recognizing the current position in order to guide the mouse 200 to a destination when the mouse is in the motion mode. In the present embodiment, the mouse 200 moves itself along a motion line provided on the placement surface on which the mouse 200 is placed, in the motion mode. In order to trace the motion line at this time, the motion detection unit includes a light emitting unit such as a LED, and a light receiving unit such as a photo sensor for detecting the emitted light. The motion detection unit outputs the detection result by the light receiving unit to the analysis unit (not shown in figures) of the drive board 236. In addition, the motion detection unit is a sensor for tracing the motion line in the present embodiment, but may perform position detection of the mouse 200 by using a GPS, for example.

In the normal mode, such mouse 200 functions as an operation means for operating the information processing apparatus 100 in the same manner as an optical mouse in the related art. At this time, the bottom of the lower cover 202 of the mouse 200 is in contact with the placement surface of the mouse 200 as shown in FIG. 5. Then, the form of the mouse 200 changes as shown in FIG. 6 when a mode change instruction for changing from the normal mode to the motion mode is output from the control microcomputer mounted on the control board 208 to the driver for driving the raising and lowering motor 222 according to the use state of the information processing apparatus 100.

That is, the raising and lowering motor 222 drives and the lead screw 223 rotates in a positive direction, and the nut 224 screwed with the lead screw 223 rises. Then, the connection part 225 connected with the nut 224 rises with the nut 224, and the upper cover 201 connected to the engaging part 225a of the connection part 225 rises. Then, the upper cover 201 of the mouse 200 leans toward the front due to its own weight, and the base 227 connected with the upper cover 201 rotates around the raising and lowering shaft 226 and leans toward the front. By this, the front wheel 228 provided on the positive side of the x axis of the base 227 is exposed from the inside of the upper cover 201. Moreover, by the upper cover 201 leaning toward the front, the back surface side of the upper cover 201 rises and the two wheels 234 are exposed from the inside of the upper cover 234.

When the mouse 200 becomes movable state as shown in FIG. 6, the control microcomputer outputs a move instruction signal to the driver on the drive board 236 which drive-controls the motion motor 232. Then, the driver controls the mouse 200, for example to move to the battery charger 205, based on the analysis information by the motion detection unit.

After that, when the switch sensor 229 detects the arrival of the mouse 200 at the battery charger 205, the control microcomputer outputs a mode change instruction for changing the mouse 200 from the motion mode to the normal mode to the driver for driving the raising and lowering motor 222. The driver drives the raising and lowering motor 222 and rotates the lead screw 223 in the reverse direction to cause the slider mechanism to descend. By this, the upper cover 201 is caused to descend and the mouse 200 can be transformed to the form in the normal mode as shown in FIG. 5.

As above, there has been described the hardware configuration of the information processing apparatus 100 and the mouse 200 according to the present embodiment. Next, functional configurations of the information processing apparatus 100 and the mouse 200 according to the present embodiment will be described based on FIG. 7. In addition, FIG. 7 is a block diagram showing the functional configurations of the information processing apparatus 100 and the mouse 200 which constitute the control system 1 according to the present embodiment.

(3) Functional Configuration of the Control System

[Functional Configuration of the Information Processing Apparatus]

Figure 7:
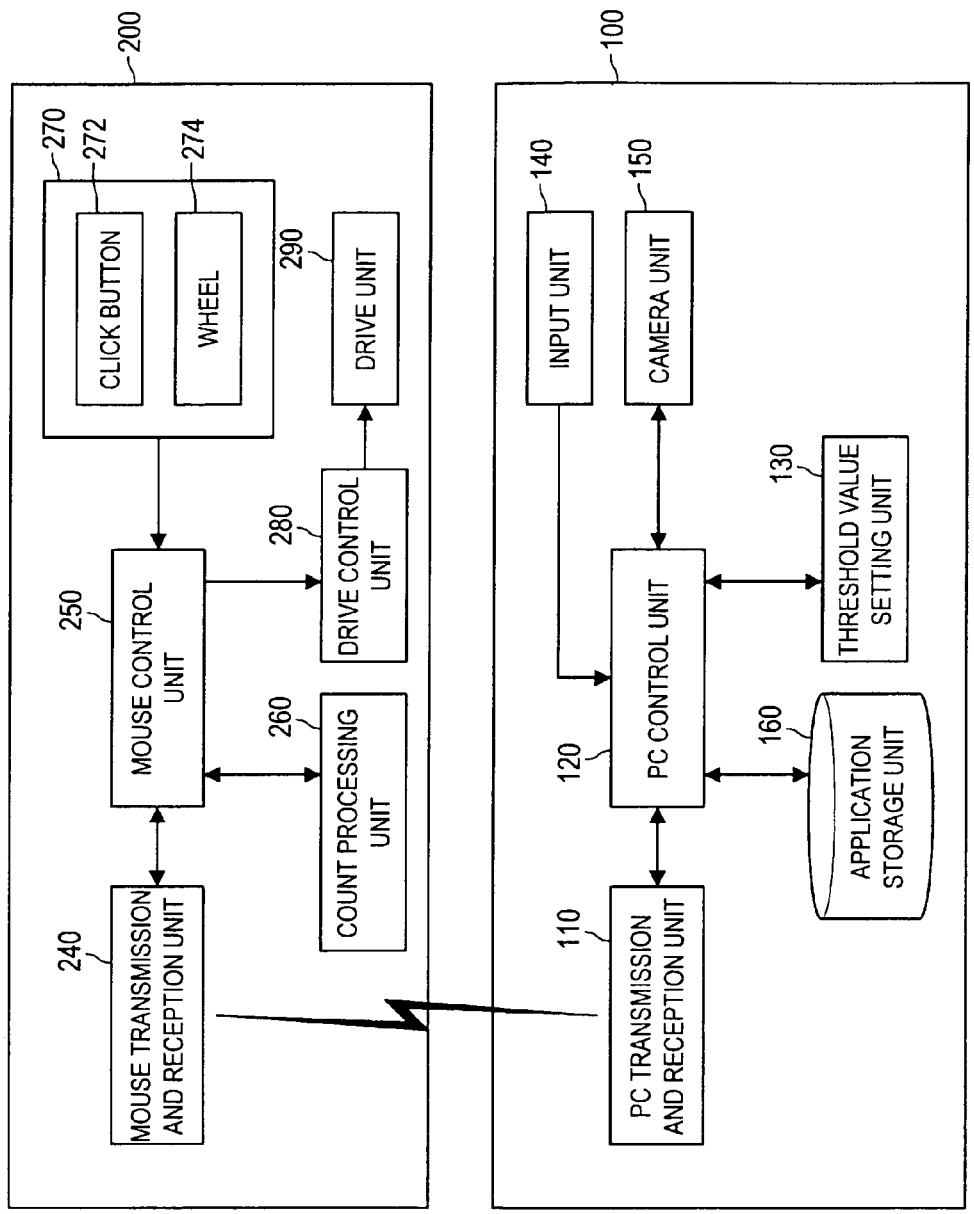
FIG. 7 is a block diagram showing functional configurations of the information processing apparatus and the mouse which constitute the control system according to the embodiment.

The information processing apparatus 100 according to the present embodiment includes a PC transmission and reception unit 110, a PC control unit 120, a threshold value setting unit 130, an input unit 140, a camera unit 150 and an application storage unit 160, as shown in FIG. 7.

The PC transmission and reception unit 110 is a functional unit for performing transmission and reception of information with the mouse 200, and a Bluetooth (registered trademark) can be used, for example. The PC transmission and reception unit 110 transmits information input from the PC control unit 120 to the mouse 200 as well as outputs information received from the mouse 200 to the PC control unit 120.

The PC control unit 120 is a control unit for controlling the entire information processing apparatus 100, and functions by the CPU 101 in FIG. 2, for example. The PC control unit 120 outputs the information received from the PC transmission and reception unit 110 to another functional unit described below, and at the same time, outputs information input from such other functional unit to the PC transmission and reception unit 110. The PC control unit 120 also functions as an application execution unit for executing an application stored in the application storage unit 160. Furthermore, when having executed the application, the PC control unit 120 outputs a threshold value setting instruction to the threshold value setting unit 130 and receives a set threshold value from the threshold value setting unit 130. Moreover, the PC control unit 120 also functions as a determination unit for determining the use state of the information processing apparatus 100 by the user, based on input information from the input unit 140 and the camera unit 150.

The threshold value setting unit 130 is a functional unit for setting, according to the running application, a threshold value which determines a timing of changing the operational state of the mouse 200. Based on the threshold value setting instruction from the PC control unit 120, the threshold value setting unit 130 sets the threshold value corresponding to the running application and outputs the set threshold value to the PC control unit 120.

The input unit 140 is a functional unit from which the input information is input into the information processing apparatus 100. The input information from an input means other than the mouse 200 such as the keyboard 300, for example, is input into the input unit 140. The input information input from the input unit 140 is output to the PC control unit 120.

The camera unit 150 is an imaging means for imaging an image, and functions as a detection unit for detecting a presence of the user in the present embodiment. The camera unit 150 may be provided to the information processing apparatus 100 itself or may be provided as an external device connected with the information processing apparatus 100. The camera unit 150 images a position facing the display surface of the display 400 and outputs the imaged image to the PC control unit 120, for example.

The application storage unit 160 is a storage unit for storing therein an application program executed in the information processing apparatus 100. The application storage unit 160 is the ROM 102 or the RAM 103 shown in FIG. 2, for example. The application program stored in the application storage unit 160 is executed by the PC control unit 120.

[Functional Configuration of the Mouse]

The mouse 200 according to the present embodiment includes a mouse transmission and reception unit 240, a mouse control unit 250, a count processing unit 260, an operation unit 270, a drive control unit 280 and a drive unit 290.

The mouse transmission and reception unit 240 is a functional unit for performing transmission and reception of information with the information processing apparatus 100, and a Bluetooth (registered trademark) can be used, for example. The mouse transmission and reception unit 240 transmits information input from the mouse control unit 250 to the information processing apparatus 100 as well as outputs information received from the information processing apparatus 100 to the mouse control unit 250.

The mouse control unit 250 is a control unit for controlling the entire mouse 200. The mouse control unit 250 functions by the control microcomputer mounted on the control board 208, for example. The mouse control unit 250 outputs the information received from the mouse transmission and reception unit 240 to another functional unit described below, and at the same time, outputs information input from such other functional unit to the mouse transmission and reception unit 240. When the mouse control unit 250 receives, via the mouse transmission and reception unit 240, information that the application program has been activated in the information processing apparatus 100, the mouse control unit 250 instructs the count processing unit 260 to start a time count. Moreover, when having received operation information by the operation unit 270, the mouse control unit 250 outputs the operation information to such other functional unit. Furthermore, the mouse control unit 250 outputs the instruction to change the mode to the drive control unit 280 based on a determination result by the count processing unit 260 indicating whether to change the operational state of the mouse 200 or a detection result by a detection unit (not shown in figures) of the switch sensor 229 and the like. Moreover, the mouse control unit 250 calculates motion information for the mouse 200 to move to the predetermined position and position information of the mouse 200 operating in the normal mode, and the like.

The count processing unit 260 counts the nonuse time of the information processing apparatus 100 as well as functions as a determination unit for determining whether to change the operational state of the mouse 200. The count processing unit 260 starts to count when having received the count start instruction from the mouse control unit 250. Then, when the count processing unit 260 determines that the count value exceeds the threshold value set in the information processing apparatus 100, the count processing unit 260 outputs the determination result to the mouse control unit 250.

The operation unit 270 is a functional unit for inputting the input information from the mouse 200 and includes a click button 272, a wheel 274 and the like. The click button 272 corresponds to the click button 204 in FIG. 3, and the wheel 274 corresponds to the wheel 206 in FIG. 3. The input information input from the operation unit 270 is output to the mouse control unit 250.

The drive control unit 280 is a driver for drive-controlling the drive unit 290. The drive control unit 280 controls the drive unit 290 based on the mode change instruction and motion instruction from the mouse control unit 250. The drive control unit 280 outputs a drive control signal to the drive unit 290.

The drive unit 290 is a drive means for causing the mouse 200 to operate, and corresponds to, for example, the raising and lowering motor 222 or the motion motor 232. The drive unit 290 is driven based on the drive control signal from the drive control unit 280.

Figure 8:
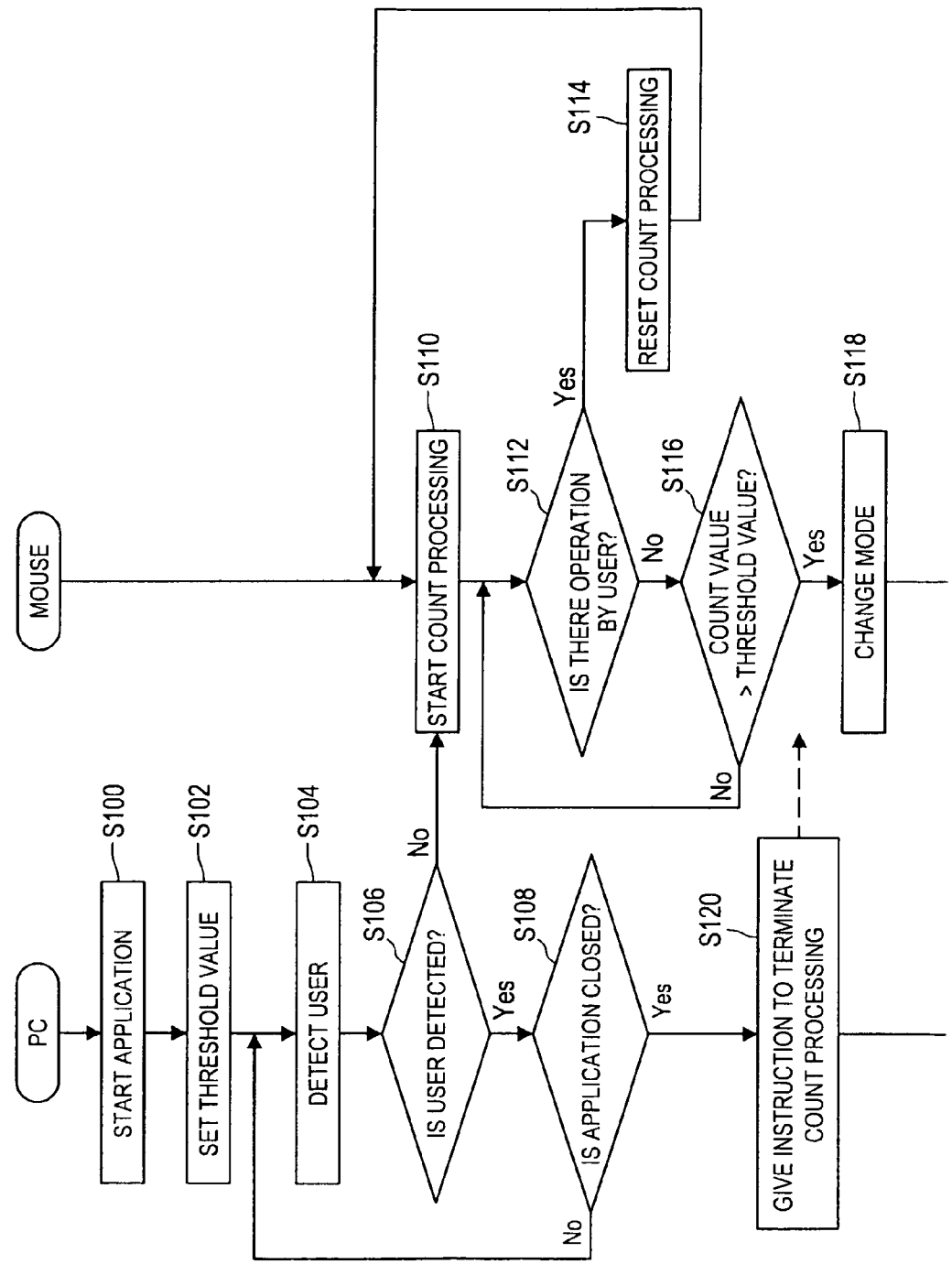
FIG. 8 is a sequence diagram showing a control method for changing an operational state of the mouse in the control system according to the embodiment.

As above, there has been described the functional configurations of the information processing apparatus 100 and the mouse 200 which constitute the control system 1 according to the present embodiment. Next, there will be described a control method for changing the operational state of the mouse 200 in the control system 1 according to the present embodiment, based on FIG. 8. In addition, FIG. 8 is a sequence diagram showing the control method for changing the operational state of the mouse 200 in the control system 1 according to the present embodiment.

(4) Control Method for Changing the Operational State of the Mouse

In the control system 1 according to the present embodiment, the mouse 200 normally functions as an operation means (Normal mode). First, let us assume that an application is started in the information processing apparatus (PC) 100 (step S100). When the application is started, the PC control unit 120 instructs the threshold value setting unit 130 to set a threshold value (step S 102). At this time, the PC control unit 120 outputs, to the threshold value setting unit 130, application information which includes the type of the application as information. The threshold value setting unit 130 sets a first threshold value for the information processing apparatus 100 and a second threshold value for the mouse 200 according to the type of the application.

For example, when a browser for browsing the Internet is started, the use frequency of the information processing apparatus 100 and that of the mouse 200 can be considered nearly the same, so that the first threshold value and the second threshold value can be set to the same value. Moreover, when table calculation software or document creation software is started, the use frequency of the mouse 200 can be considered to be less than that of the information processing apparatus 100, so that the second threshold value is set greater than the first threshold value. Furthermore, when video/music viewing/listening software is started, the use frequency of the information processing apparatus 100 can be considered to be less than that of the mouse 200, so that the first threshold value is set greater than the second threshold value. In this manner, each of the threshold values for the information processing apparatus 100 and the mouse 200 is set according to the type of the started application. In addition, not only may the magnitude of the threshold value be relatively changed according to the application, but also changed per application in such a manner that the threshold value for the video/music viewing/listening software is made greater than that for the document creation software.

Next, a user of the information processing apparatus 100 is detected (step S104), and it is determined whether the user is detected or not (step S106). The diction of the user can be performed by using the image imaged by the camera unit 150. For example, the PC control unit 120 performs face detection processing on the imaged image input from the camera unit 150 and determines whether a human face is present in the image. Then, when it is determined that a human face is present in the image, it is determined that the user is using the information processing apparatus 100 and the processing proceeds to step 108. At the step S108, it is determined that the application has been terminated. If the application is running, the processing returns to the step S104, and the detection processing of the user is performed. When the application is terminated at the step S108, the instruction to terminate count processing is notified to the mouse 200 (step S120).

On the other hand, when the user is not detected at the step S106, the information processing apparatus 100 transmits the instruction to start the count processing to the mouse 200 via the PC transmission and reception unit 110. In response, the count processing of the mouse 200 starts the count processing (step S110). That is, the mouse 200 starts to count nonuse time of the information processing apparatus 100. At this time, the information processing apparatus 100 notifies the mouse of the first threshold value and the second threshold value along with the count processing start instruction. In addition, detection information of the user is notified to the user 200 at predetermined intervals afterward.

Subsequently, the mouse control unit 250 determines whether the user operates the mouse 200 or not (step S112). Whether the user operates the mouse 200 or not can be determined by the presence or absence of input information from the operation unit 270 such as the click button 270 and the wheel 274, for example. When having detected the input information from the operation unit 270, the mouse control unit 250 determines that the user is using the information processing apparatus 100 and instructs the count processing unit 260 to reset the count (step S114). Then, when the count is reset, the processing returns to the step S110 and counting is started again.

On the other hand, when the input information from the operation unit 270 is not detected at the step S112, it is determined that the user is not using the information processing apparatus 100. Then, the mouse control unit 250 causes the count processing unit 260 to compare the current count value and the threshold value (step S116). At the step S116, there are compared the count value obtained by counting the nonuse time of the information processing apparatus 100, from the use state of the information processing apparatus 100 detected by the step S106, and the first threshold value. Furthermore, there are compared the count value obtained by counting the nonuse time of the mouse 200 and the second threshold value. Then, it is determined whether at least one of the count values exceeds the threshold value or not.

When neither of the count values exceeds the threshold value at the step S116, the processing returns to the step S112, and the use state of the mouse 200 is detected. On the other hand, when either of the count values exceeds the threshold value, the operational state of the mouse 200 is changed from the normal mode to the motion mode (S118). At this time, the mouse control unit 250 outputs the mode change instruction to the drive control unit 280, and the drive control unit 280 drive-controls the drive unit 290 based on the mode change instruction. By this, the mouse 200 transforms from the form in the normal mode shown in FIG. 5 to the form in the motion mode shown in FIG. 6. Subsequently, the mouse control unit 250 outputs the motion instruction to the drive control unit 280 and causes the drive control unit 280 to control the drive unit 290 to move the mouse 200 to the predetermined position such as the battery charger.

In this manner, according to the present embodiment, it is possible to cause the mouse 200 to automatically determine to change from the normal mode to the motion mode and move to the battery charger when it is detected that the information processing apparatus 100 is not used for a predetermined time. By this, the battery 210 of the mouse 200 is charged when the information processing apparatus 100 is not used, so that the user can use the mouse 200 always in a fully charged state. Moreover, there can be prevented a situation in which the mouse 200 is forgotten to be charged and thus cannot be used. This can improve the convenience of the information processing apparatus 100.

As above, there has been described the control method for changing the operational state of the mouse 200 in the control system 1 according to the first embodiment of the present invention. According to the present embodiment, when the threshold values for the information processing apparatus 100 and the mouse 200 are set in the threshold value setting unit 130, each of the threshold values is set according to the type of the running application. This can prevent the operational state of the mouse 200 from being changed during the use of the information processing apparatus 100. Furthermore, the mouse 200 automatically determines the change in the operational state and operates in the operational state corresponding to the use state of the information processing apparatus 100, so that the convenience of the information processing apparatus 100 can be improved.

2. Second Embodiment

Figure 9:
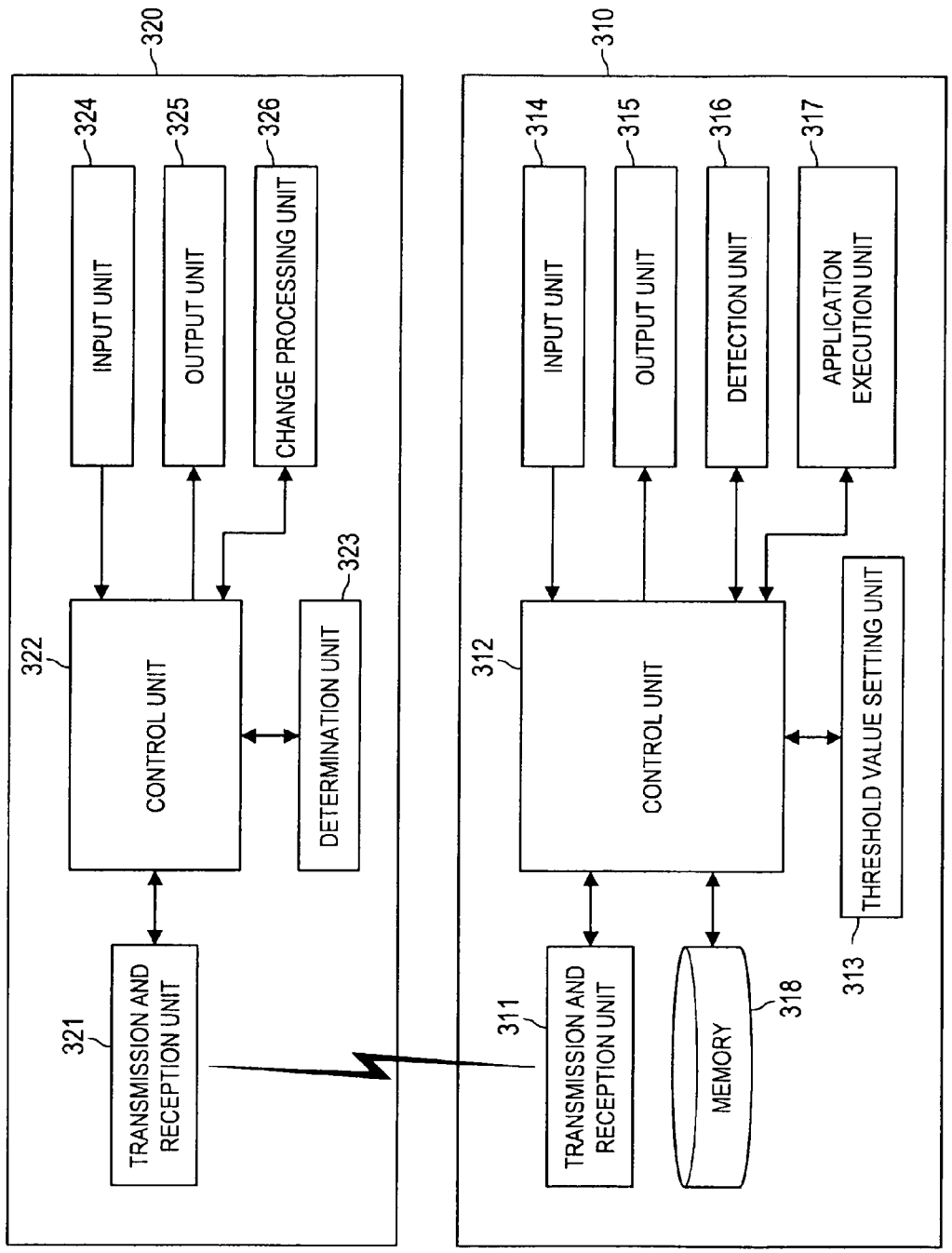
FIG. 9 is a block diagram showing functional configurations of devices constituting a control system according to a second embodiment of the present invention.

Next, a second embodiment of the present invention will be described based on FIG. 9. In the present embodiment, there will be described a control system configured by connecting an information processing apparatus 310 capable of executing an application and an external device 320 which functions in connection with the information processing apparatus 310, in a manner that they can communicate with each other. The present embodiment is a variation of the control system 1 including the information processing apparatus 100 such as a personal computer and the mouse 200 shown in the first embodiment, and is an example of applying the control system 1 to devices other than the information processing apparatus 100 and the mouse 200. In the following, a configuration of a control system according to the present embodiment and its operation will be described. In addition, FIG. 9 is a block diagram showing functional configurations of devices constituting the control system according to the present embodiment. In addition, although FIG. 9 shows a state in which an external device 320 is connected to an information processing apparatus 310, the external device 320 may be more than one.

(1) Functional Configuration of the Control System

[Functional Configuration of the Information Processing Apparatus 100]

The information processing apparatus 310 according to the present embodiment includes a transmission and reception unit 311, a control unit 312, a threshold value setting unit 313, an input unit 314, an output unit 315, a detection unit 316, an application execution unit 317, and a memory 318, as shown in FIG. 9.

The transmission and reception unit 311 is a functional unit for performing transmission and reception of information with the external device 320, and a Bluetooth (registered trademark) can be used, for example. The transmission and reception unit 311 transmits information input from the control unit 312 to the external device 320 as well as outputs information received from the external device 320 to the control unit 312.

The control unit 312 is a control unit for controlling the entire information processing apparatus 310. The control unit 312 outputs the information received from the transmission and reception unit 311 to another functional unit described below, and at the same time, outputs information input from such other functional unit to the transmission and reception unit 311. When an application is executed, the control unit 312 outputs a threshold value setting instruction to the threshold value setting unit 313 and receives a set threshold value from the threshold value setting unit 313. Moreover, the control unit 312 also functions as a determination unit for determining the use state of the information processing apparatus 310 by the user, based on input information from the input unit 314 and the detection unit 316. Moreover, the control unit 312 outputs information to the output unit 315.

The threshold value setting unit 313 is a functional unit for setting, according to the running application, a threshold value which determines a timing of changing the operational state of the external device 320. Based on the threshold value setting instruction from the control unit 312, the threshold value setting unit 313 sets the threshold value corresponding to the running application and outputs the set threshold value to the control unit 312. The threshold value setting unit 313 sets a threshold value for each of the information processing apparatus 310 and at least one external device 320 connected to the information processing apparatus 310.

The input unit 314 is a functional unit for inputting the input information into the information processing apparatus 310. The input information from the external device connected to the information processing apparatus 310 is input into the input unit 314. The input information input from the input unit 314 is output to the control unit 312.

The output unit 315 is a functional unit for outputting output information from the information processing apparatus 310. The output information to the external device connected to the information processing apparatus 310 is output to the output unit 315 from the control unit 312.

The detection unit 316 is a functional unit for detecting the use state of the information processing apparatus 310. The detection unit 316 may be the imaging means for imaging an image shown in the first embodiment, an ambient light sensor, or an infrared radiation sensor, for example. The detection unit 316 can function according to a detection instruction by the control unit 312. The detection information detected by the detection unit 316 is output to the control unit 312.

The application execution unit 317 is a functional unit for executing the application stored in the memory 318 and outputs the execution state or the execution result to the control unit 312.

The memory 318 is a storage unit for storing information, and may be a ROM or a RAM, for example. An application program, a threshold value preliminarily set according to the application and the like can be stored in the memory 318, for example.

[Functional Configuration of the External Device]

The external device 320 according to the present embodiment includes a transmission and reception unit 321, a control unit 322, a determination unit 323, an input unit 324, an output unit 325, and a change processing unit 326.

The transmission and reception unit 321 is a functional unit for performing transmission and reception of information with the information processing apparatus 310, and a Bluetooth (registered trademark) can be used, for example. The transmission and reception unit 321 transmits information input from the control unit 322 to the information processing apparatus 310 as well as outputs information received from the information processing apparatus 310 to the control unit 322.

The control unit 322 controls the entire external device 320. The control unit 322 outputs the information received from the transmission and reception unit 321 to another functional unit described below, and at the same time, outputs information input from such other functional unit to the transmission and reception unit 321, for example. When having received information that the application program has been started in the information processing apparatus 310 via the transmission and reception unit 321, the control unit 322 instructs the determination unit 323 to monitor nonuse state of the information processing apparatus 310. The control unit 322 instructs the change processing unit 326 to change the operational state based on a determination result of the determination unit 323. Moreover, the control unit 322 notifies the output unit 325 of information input from the change processing unit 326 and causes the operational state of the external device 320 to be changed.

The determination unit 323 monitors the nonuse state of the information processing apparatus 310 as well as functions as a determination unit for determining whether or not to change the operational state of the external device 320. The determination unit 323 determines whether or not to change its own operational state based on the use state of the information processing apparatus 310 notified from the information processing apparatus 310 or the use state of the external device 320. Such determination processing can be performed by counting the nonuse time and determining whether the nonuse time exceeds a threshold value or not, in the same manner as the first embodiment, for example. The determination unit 323 outputs the determination result to the control unit 322.

The input unit 324 is a functional unit for inputting input information into the external device 320. For example, if the external device 320 is a keyboard, the input unit 324 corresponds to an input key. Moreover, a human sensor or the like for detecting the use state of the external device 320 is included in the input unit 324. The input information input from the input unit 324 is output to the control unit 322.

The output unit 325 is a functional unit for outputting output information from the external device 320. For example, if the external device 320 is a keyboard, the output unit 325 is a lamp or the like for notifying the user of the information. The output unit outputs the output information input from the control unit 322.

The change processing unit 326 is a functional unit for changing the operational state of the external device 320 according to the use state of the information processing apparatus 310. When having received the instruction to change the operational state from the control unit 322, the change processing unit 326 performs processing of moving from the current operational state to a predetermined operational state. If it is necessary to cause another functional unit to function in order to change the operational state, the change processing unit 326 outputs change instruction information to the control unit 322.

(2) Control Method in the Control System

In such control system including the information processing apparatus 310 and the external device 320, the operational state of the external device 320 is changed according to the use state of the information processing apparatus 310. At this time, a timing of changing the operational state is changed according to the type of the application being executed in the information processing apparatus 310. This enables the external device 320 to function in a manner consistent with a user's purpose for using the information processing apparatus 310.

In the control system according to the present embodiment, a threshold value which determines a timing of changing the operational state of the external device 320 is first set by starting the application in the information processing apparatus 310. The threshold value setting unit 313 sets a threshold value, which is a limit time for the nonuse time, for the information processing apparatus 310 and the external device 320 according to the type of the started application. The external device 320 used for operating the information processing apparatus 310 varies according to the type of the application. For example, if document creation software is started, the use frequency of the keyboard increases, and if figure drawing software is started, the use frequency of the mouse or a graphics tablet increases. Accordingly, the threshold value of the frequently used external device is set lower than that of the information processing apparatus 310 or another external device 320, thereby can prevent the operational state of the external device 320 from being changed during the use of the information processing apparatus 310. In this manner, the threshold value is set according to a relationship between the type of the application and the external device 320 relating to the use thereof.

Subsequently, the input unit 314 or the detection unit 316 starts to monitor the use state of the information processing apparatus 310. When the use of the information processing apparatus 310 by the user is not detected, the control unit 312 of the information processing apparatus 310 notifies the external device 320 via the transmission and reception unit 311 to measure the nonuse time of each of the information processing apparatus 310 and the external device 320. At this time, the threshold value set in the threshold value setting unit 313 is also transmitted to the external device 320. The external device 320 which has received such notification determines whether the nonuse time exceeds the threshold value or not in the determination unit 323. The current operational state is maintained until the nonuse time exceeds the threshold value. Moreover, when there is an input of the input information from the input unit 324 into the control unit 322, it is determined that the external device 320 is used, and the counted nonuse time is reset and counting of the nonuse time is started again.

On the other hand, when the nonuse time of the information processing apparatus 310 exceeds the threshold value, the control unit 322 receives notification from the determination unit 323 and instructs the change processing unit 326 to change the operational state. The change processing unit 326 performs the processing of changing the current operational state to the predetermined operational state. Subsequently, when release information for releasing the changed operational state is input from the input unit 324, the change processing unit 326 receives the release information via the control unit 322. Then, the change processing unit 326 performs processing of changing from the changed operational state to its former state.

As above, there has been described the control method of the operational state of the external device 320 in the control system according to the second embodiment of the present invention. According to the present embodiment, when the threshold values for the information processing apparatus 310 and the external device 320 are set in the threshold value setting unit 313, each of the threshold values is set according to the type of the running application. This can prevent the operational state of the external device 320 from being changed during the use of the information processing apparatus 310. Furthermore, the external device 320 automatically determines the change in the operational state and operates in the operational state corresponding to the use state of the information processing apparatus 310, so that the convenience of the information processing apparatus 310 can be improved.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although the threshold value setting unit is provided in the information processing apparatus which executes the application in the above embodiments, the present invention is not limited thereto, and the threshold value may be set on the side of the external device such as the mouse, for example. At this time, the external device receives the type of the application executed in the information processing apparatus and sets the threshold value based on such information.

Moreover, although transformation processing is performed when either of the two count values exceeds the threshold value in the above embodiments, the present invention is not limited thereto. For example, the transformation processing may be performed when all the count values exceed the set threshold values. Furthermore, although the operational state of the external device such as the mouse has two modes in the above embodiments, the present invention is not limited thereto. Three or more states may be switched, for example.

What is claimed is:
1. A control system, comprising:
  an information processing apparatus; and
  an external device communicably connected with the information processing apparatus;
  the information processing apparatus including:
    an execution unit for executing an application,
    a threshold value setting unit for setting a first threshold value for the information processing apparatus and a second threshold value for the external device which are determined according to the running application,
    a first detection unit for detecting a use state of the information processing apparatus, and
    a first transmission and reception unit for exchanging information with the external device; and
  the external device including:
    a second transmission and reception unit for exchanging information with the information processing apparatus,
    a second detection unit for detecting an input signal to the external device, a determination unit for determining whether or not to change the operational state of the external device based on the first and second threshold values set by the threshold value setting unit of the information processing apparatus and based on the detection result by at least one of the first detection unit or the second detection unit, and a change processing unit for changing the operational state of the external device based on the determination result by the determination unit.

2. The control system according to claim 1, wherein the threshold value setting unit sets the first threshold value for the information processing apparatus and the second threshold value for the external device based on a use frequency of the information processing apparatus and a use frequency of the external device which are determined by the application in execution.

3. The control system according to claim 2, wherein the threshold value setting unit sets, for an application in which the use frequency of the external device is greater than the use frequency of the information processing apparatus, the second threshold value for the external device lower than the first threshold value for the information processing apparatus.

4. The control system according to claim 2, wherein the threshold value setting unit sets, for an application in which the use frequency of the information processing apparatus is greater than the use frequency of the external device, the first threshold value for the information processing apparatus lower than the second threshold value for the external device.

5. The control system according to claim 1, wherein in response to the first detection unit not detecting an input signal to the information processing apparatus, the first transmission and reception unit transmits the first and second threshold values and an instruction for the external device to start to count nonuse time of the information processing apparatus to the second transmission and reception unit, the determination unit thereby starts to count the nonuse time of the information processing apparatus and starts to count nonuse time of the external device, and in response to the first detection unit and the second detection unit not detecting the input signals to the information processing apparatus and the external device and either the counted nonuse time of the information processing apparatus exceeding the threshold value or the counted nonuse time of the external device exceeding the second threshold value, the change processing unit changes the operational state of the external device.

6. The control system according to claim 5, wherein when the second detection unit detects the input signal to the external device after the determination unit starts to count the nonuse time of the external device and before the counted nonuse time of the external device exceeds the second threshold value, the determination unit resets the counted nonuse time of the external device.

7. The control system according to claim 5, wherein when the first detection unit detects an input signal for terminating the running application, the first transmission and reception unit transmits to the second transmission and reception unit an instruction for the determination unit to terminate the counting of the nonuse times.

8. The control system according to claim 1, wherein the use state of the information processing apparatus is based on whether use of the information processing apparatus by a user is detected.

9. The control system according to claim 1, wherein the first detection unit is a camera, an ambient light sensor, or an infrared radiation sensor.

10. An operation device, comprising:
an operation unit for operating an information processing apparatus which is communicably connected;
a transmission and reception unit for exchanging information with the information processing apparatus;
a determination unit for determining whether to change an operational state of the operation device based on a first and second threshold values associated with the information processing apparatus and the operation device, respectively, and based on presence or absence information about at least one of an input signal input from the operation unit or a use state of the information processing apparatus received via the transmission and reception unit; and
a change processing unit for changing the operational state based on a determination result by the determination unit.

11. The operation device according to claim 10, further comprising:
a motion unit for moving the operation device to a predetermined position;
a drive unit for driving the motion unit; and
a position recognition unit for recognizing a position of the operation device,
wherein in an absence of the input signal input from the operation unit and an input signal input from the information processing apparatus, the change processing unit enables an operation by the operation unit until either a counted nonuse time of the information processing apparatus exceeds the first threshold value or a counted nonuse time of the operation device exceeds the second threshold value, and
in response to either the counted nonuse time of the information processing apparatus exceeding the first threshold value or the counted nonuse time of the operation device exceeding the second threshold value, the change processing unit causes the drive unit to drive the motion unit to move the operation device to the predetermined position.

12. The operation device according to claim 10, wherein the use state of the information processing apparatus is based on whether use of the information processing apparatus by a user is detected.

13. The operation device according to claim 12, wherein in response to the use of the information processing apparatus not being detected, the transmission and reception unit receives, from the information processing apparatus, the first and second threshold values and an instruction to start to count nonuse time of the information processing apparatus, the determination unit starts to count the nonuse time of the information processing apparatus and starts to count nonuse time of the operation device, and in response to either the counted nonuse time of the information processing apparatus exceeding the first threshold value or the counted nonuse time of the operation device exceeding the second threshold value, the change processing unit changes the operational state of the operation device.

14. A control method, comprising:
executing an application by an information processing apparatus;
determining a first threshold value for the information processing apparatus and a second threshold value for an external device communicably connected with the information processing apparatus, the first and second threshold values being determined according to the executing application;

detecting a use state of the information processing apparatus;

detecting an input signal to the external device;

determining whether or not to change the operational state of the external device based on the first and second threshold values and based on the detection result of at least one of the use state of the information processing apparatus or the input signal to the external device; and changing the operational state of the external device based on the determination result.

15. The method according to claim 14, wherein the use state of the information processing apparatus is based on whether use of the information processing apparatus by a user is detected.

16. The method according to claim 14, wherein in response to not detecting an input signal to the information processing apparatus, the determining step includes counting nonuse time of the information processing apparatus and nonuse time of the external device, and in response to either the counted nonuse time of the information processing apparatus exceeding the first threshold value or the counted nonuse time of the external device exceeding the second threshold value, changing the operational state of the external device.

17. The method according to claim 16, wherein in response to not detecting an input signal to the information processing apparatus, the information processing apparatus transmits the first and second threshold values and an instruction for the external device to start to count the nonuse time of the information processing apparatus to the external device, and the external device thereby starts the counting of the nonuse time of the information processing apparatus and the counting of the nonuse time of the external device.

18. The method according to claim 16, wherein when the input signal to the external device is detected after the start of the counting of the nonuse time of the external device and before the counted nonuse time of the external device exceeds the second threshold value, the counted nonuse time of the external device is reset.

19. The method according to claim 16, wherein when an input signal for terminating the running application is detected, the information processing apparatus transmits an instruction to terminate the counting of the nonuse times to the external device.

20. The method according to claim 14, wherein for an application in which a use frequency of the external device is greater than a use frequency of the information processing apparatus, the second threshold value for the external device is set lower than the first threshold value for the information processing apparatus.

21. The method according to claim 14, wherein for an application in which a use frequency of the information processing apparatus is greater than a use frequency of the external device, the first threshold value for the information processing apparatus is set lower than the second threshold value for the external device.

* * * * *